United States Patent

[11] 3,580,088

| [72] | Inventor | James A. Clark |
| | | Rochester, N.Y. |
| [21] | Appl. No. | 725,816 |
| [22] | Filed | May 1, 1968 |
| [45] | Patented | May 25, 1971 |
| [73] | Assignee | Bausch & Lomb Incorporated |
| | | Rochester, N.Y. |

[54] CURVE GENERATING LINKAGE
2 Claims, 10 Drawing Figs.

[52] U.S. Cl. ..................................................... 74/1
[51] Int. Cl. ..................................................... F16h 21/00
[50] Field of Search ............................................ 33/27, 23, 21, 25, 18; 51/284, 57, 58, 60, 287, 166.5, 33, 55, 100 (P); 74/1

[56] References Cited
FOREIGN PATENTS
566,021  12/1932  Germany ..................... 74/1

OTHER REFERENCES
Product Engineering - Aug. 1935, pages 303— 305 74/1

*Primary Examiner*—Milton Kaufman
*Attorneys*—Frank C. Parker and Hoffman Stone

ABSTRACT: A multibar linkage is used to produce a noncircular motion for generating aspherical surfaces. Linkages can be optimized to conform their output motions very accurately to predetermined curves such as those developed by optical designers for aspheric lenses and mirrors. Also, in optical design, the parameters of linkages may be used in place of mathematically expressed curves thus facilitating the simultaneous optimization of an optical system and a linkage for producing an aspheric surface for the system. A dressing tool mounted on the linkage dresses a cutting wheel to conform it to the desired curvature. The wheel shapes the workpiece accordingly.

PATENTED MAY 25 1971 3,580,088

JAMES A. CLARK
INVENTOR.

BY *Frank C. Parker*
*Hofgren Stone*
ATTORNEYS

JAMES A. CLARK
INVENTOR.

BY Frank C. Parker
H. Norman Stone
ATTORNEYS

JAMES A. CLARK
INVENTOR.

BY Frank C. Parker
H. Stone
ATTORNEYS

3,580,088

CURVE GENERATING LINKAGE

BRIEF SUMMARY

This invention relates to novel methods of and apparatus for producing noncircular, curved motions conforming very accurately to predetermined curves.

Present optical theory recognizes the advantages of aspheric elements. See, for example, an article, "Use of Aspherical Surfaces in Optical Systems" by Harry Zollner, starting at page 9 of the Jena Review (Carl Zeiss) issue 1 of 1967, and an article, "Design of Double Gauss Systems Using Aspherics" by T. R. Sloan and R. E. Hopkins in the Nov., 1967 issue of Applied Optics, Volume 6, No. 11, pages 1911, et seq. The use of aspheric elements, however, has been extremely limited, because heretofore there has been no method of producing them with the required accuracy of curvature at economic cost.

Briefly, there are two principal aspects of the invention, both based on the great versatility of linkages and the impressive capability of modern computers to carry out lengthy and tedious calculations rapidly and accurately. In accordance with the first aspect, the dimensions of a linkage are optimized by mathematical analysis to conform its output motion to a preselected noncircular curve within a predetermined tolerance, which in many cases may be closer than the tolerances achievable in practical mechanical systems. Typically, in accordance with this aspect of the invention, the preselected curve is one developed by an optical engineer to define a desired aspherical surface for use in an optical system.

The second aspect of the invention relates to the use of the parameters of a linkage as variables in the calculations for developing an optical system, thus facilitating the overall optimization of the system including one or more aspheric surfaces conforming exactly to the output motion of the linkage or linkages, and optimum compensation for any limitations that may be encountered due to the nature of the linkage or linkages. In this way, the required dimensions of the linkages flow directly from the optical calculation, and there is no need separately to calculate the dimensions required to match the output motions of the linkages to predetermined curves.

A substantial simplification is achieved, both in the design and in the manufacture of optical systems that include aspheric surfaces, enabling the practical exploitation of the advantages of aspheric surfaces in optical systems of relatively low cost.

DETAILED DESCRIPTION

The theory and a presently preferred embodiment of the invention will now be described in detail in connection with the accompanying drawings, wherein.

Figure 1:
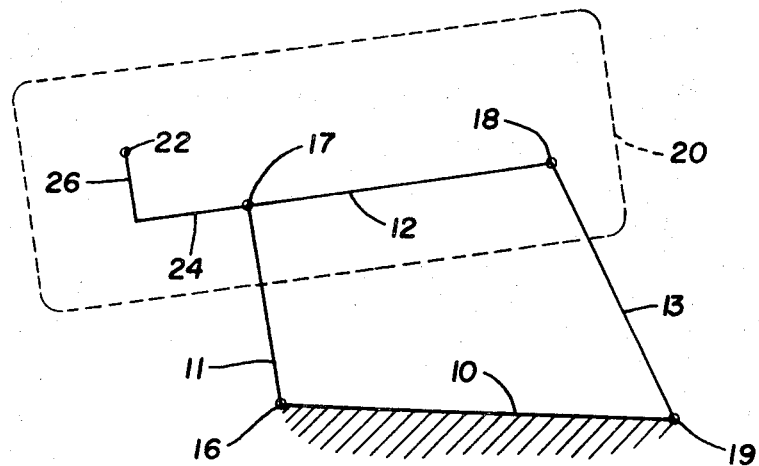
FIG. 1 is a schematic diagram of a four-bar linkage illustrating a typical approach to the analysis of its output motions.

The practice of the invention will be described first in connection with the four-bar linkage illustrated in FIGS. 1—3 of the type partly analyzed by empirical methods in a book, "Analysis of the Four-Bar Linkage" by Hrones and Nelson, published jointly by the Technology Press of M.I.T. and John Wiley & Sons, Inc., New York (1951). The linkage is constituted by four bars 10, 11, 12, and 13, which are pivotally connected end to end at pivot points 16, 17, 18, and 19, respectively. For analyzing the linkage, the first bar 10 is regarded as fixed upon a reference support, and the linkage is thought of as driven by rotation of a second bar 11 denoted the drive crank. The third bar 12, called the connecting rod, is thought of as a plate 20 of any desired size, different points of which travel through various different paths when the linkage is driven. For convenience the fourth bar 13 may be called the oscillating crank.

For mathematical analysis, a selected motion point 22 in the plate 20 is defined by reference to a straight line extension from one of the pivots 17 and 18 in either direction parallel to the connecting rod 12, and by a second extension 26 normal to the first extension 24 connecting the distal end of the first extension 24 to the motion point 22. The travel of the motion point 22 is calculated as a function of the angle $\theta$ between the drive crank 11 and the fixed link 10. As shown in FIG. 2, for any given value of $\theta$, there are two positions for the linkage depending upon the choice of intersection by the designer.

The mathematical problem is to conform the travel of the motion point 22 to a given preselected curve. This may be done by any desired optimization procedure such as, for example, one of those described in the book, "Recent Advances in Optimization Techniques" by A. Lavi and T. P. Vogl (1966) John Wiley & Sons, Inc.

The selection and optimization of the linkage should take into account the arrangement by which the output motion is to be used for generating the aspheric surface. The workpiece is typically supported for rotation about the axis of symmetry of the surface to be generated, and the cutting tool is swept along the predetermined curve in a single plane as the workpiece is rotated, thus shaping the surface. If a simple cutting point such as a diamond stylus is used, it is supported on the linkage with its cutting point accurately aligned at the point calculated to follow the desired curve. If, however, cutting is to be done by a rotating wheel 30 as shown in FIG. 3, the wheel must be supported on a center spaced from the desired curve.

This latter arrangement is very different from the one in which a stylus is mounted with its tip at the motion point. When the wheel 30 is used, the angle $\beta$ between the connecting rod 12 and the radius 31 of the wheel that touches the curve 32 changes as the linkage is driven through its motion. The angle $\beta$ becomes another parameter in the calculation, and is a function not only of the linkage, but also of the desired output curve 32 and the radius of the wheel 30.

This is a practical arrangement even though wear of the cutting wheel 30 causes the output motion to deviate from the calculated path. In the usual case, a worthwhile number of workpieces may be shaped to within the desired tolerance limits before it becomes necessary to replace the wheel.

Theoretically, maximum accuracy may be achieved using a single cutting point that may be dressed and advanced, but a simple cutting point such as a diamond stylus used against a workpiece such as optical glass is not desirable because of limitations as to the speed of cutting, wear of the cutting point, the need to keep it properly sharpened and dressed, and its tendency to chatter.

In the preferred form of the invention, therefore, the desired curve is traced by a single cutting point such as a diamond stylus, which works upon a rotating wheel to shape its cutting surface to the desired curve. The wheel transfers the curve to the rotating workpiece. In this way, full precision and accuracy can be obtained without undue wear of the diamond stylus, and wearing down of the cutting wheel can be readily compensated simply by advancing the entire linkage toward the cutting wheel as it wears away.

Figure 2:
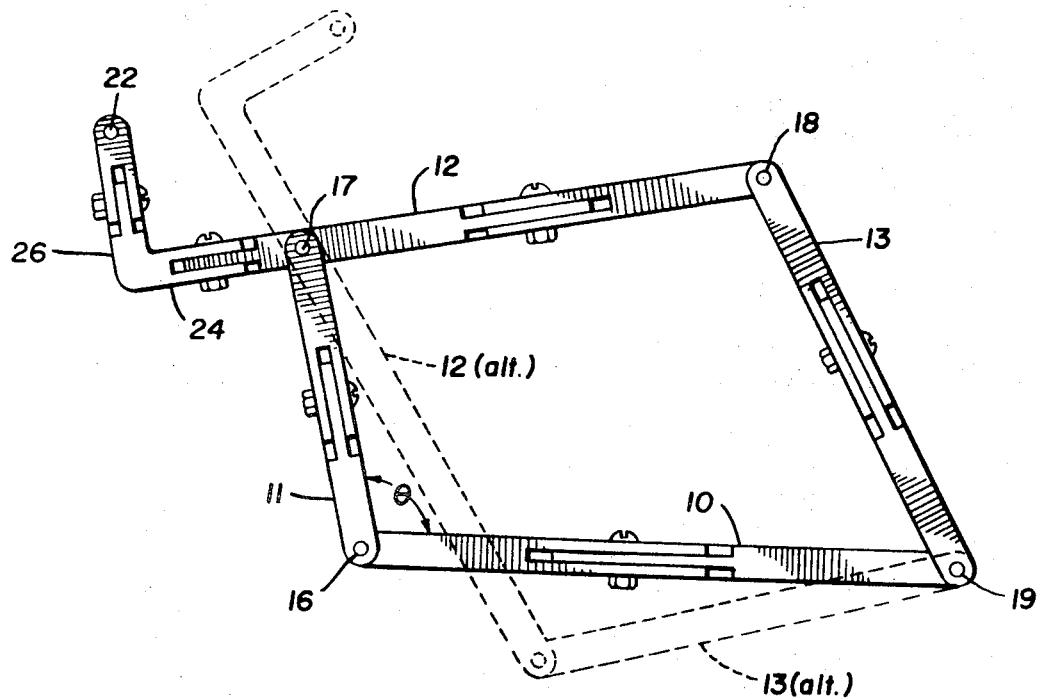
FIG. 2 is a schematic diagram generally similar to the diagram of FIG. 1, but illustrating an alternative form of the linkage.
Figure 3:
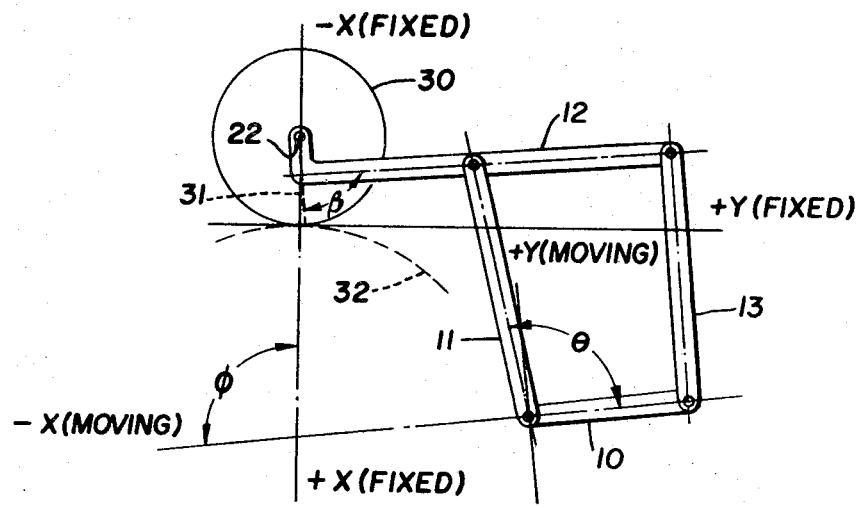
FIG. 3 is a schematic diagram illustrating another step in the analysis of the output motion of the four-bar linkage as required when it is used to support a rotating cutting tool.

Although an infinite number of different motions are achievable by the simple four-bar linkage illustrated in FIGS. 1—3, it is expected there may be predetermined curves to which the four-bar linkage cannot be adapted within desired tolerance limits. Also, it is desirable in the preferred form of the invention to arrange matters so that the stylus remains throughout its travel at a fairly constant angle relative to the generated curve. It is, therefore, generally preferred to introduce additional degrees of freedom in the system, still keeping it confined to a single plane, to enable the generation of different and sometimes more complex curves, and to facilitate maintenance of the constant angle between the stylus and the curve.

Figure 4:
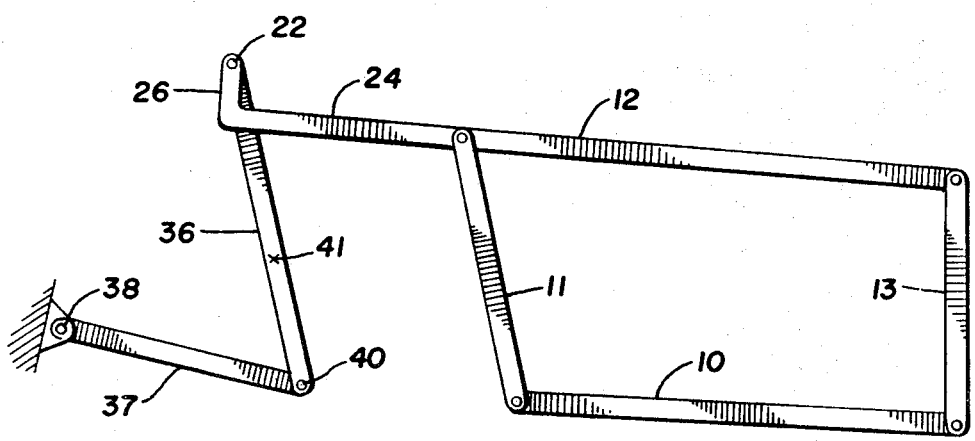
FIG. 4 is a schematic diagram of a typical six-bar linkage.

For example, a six-bar linkage is illustrated in FIG. 4, including the four links 10, 11, 12, and 13 of the four-bar linkage and the arms 24 and 26 as hereinabove described, and also including two additional links 36 and 37 connected in series between the motion point 22 of the four-bar linkage and a fixed pivot point 38. In this case, the output motion point 41 of the linkage is selected as a point fixed relative to the first added link 36. The base link 10 remains fixed, and the driving crank 11 provides the input motion.

The arrangement is denoted herein a six-bar linkage. Alternatively, it may be thought of as two linkages in series, a four-bar linkage driving the two-bar linkage consisting of the added links 36 and 37.

Figure 5:
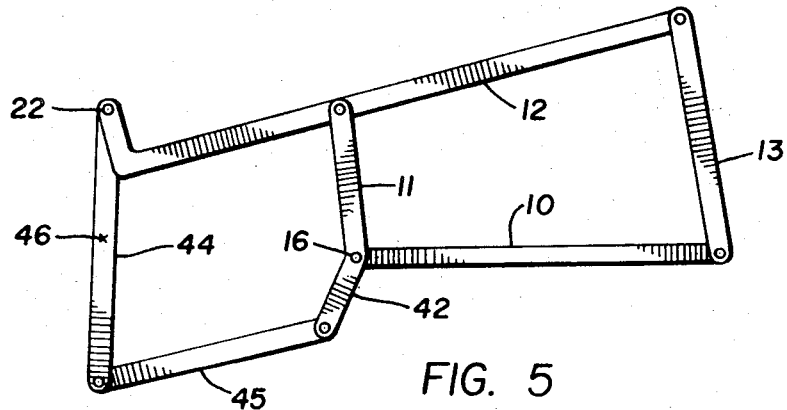
FIG. 5 is a schematic diagram of a seven-bar linkage.

A seven-bar linkage is shown in FIG. 5, and includes the basic four-bar linkage hereinabove described modified by the addition of an arm 42 fixed to the drive crank 11 at the fixed pivot 16, and a pair of links 44 and 45 pivotally connected between the four-bar motion point 22 and the distal end of the arm 42. In this case, the motion point 46 is selected as a point fixed relative to one of the added links 44 and 45.

Designation of the linkage shown in FIG. 5 as a seven-bar linkage is a matter of convenient terminology. It could, as correctly, be denoted a modified six-bar linkage, or a modified four-bar linkage coupled to a two-bar linkage. The drive crank 11 and the arm 42 constitute a bellcrank, and the two added links 44 and 45 are connected end to end between the motion point 22 of the modified four-bar linkage and the distal end of the bellcrank.

A typical optimizing calculation for ascertaining the dimensions of the various components of a linkage to achieve a desired output motion comprises first constructing an imaginary model of the linkage. The model is selected on the basis of the designer's experience and intuition, and is preferably confined to a single plane without skewed motions so that when it is embodied in an actual mechanical linkage, the structure will be sturdy and not subject to the difficulties and inaccuracies usually present in skewed systems. The lengths and directions of the links and of the extensions 24 and 26 then constitute parameters in the model that may be manipulated in the optimizing calculations to conform the motion of the output point to the desired curve.

Arbitrarily selected values are assigned to all of the independent dimensions of the imaginary model, taking care to avoid clearly unrealistic values. The model is then carried through its motion in a stepwise manner, and the position of the motion point at each step is calculated and compared with the position required by the optical design.

In general, in the design of optical systems, the desired curves are ordinarily first designed by the optical designer, who sets up equations defining them, plots curves representing the equations, and also calculates coordinate values for the curves at relatively large numbers of points along them, together with the permissible positional tolerance at each point. This data is ordinarily presented to the mechanical engineer with a request for elements having surfaces that conform to the calculated curves. In working with this aspect of the invention, therefore, data defining the prescribed motion and the desired tolerances are available.

The model is carried through its motion mathematically in a stepwise manner, changing the angle $\theta$ by successive, arbitrarily chosen increments. This calculation produces sets of coordinate values for the motion point at the various different values of $\theta$. By interpolation, values at the desired coordinate positions are calculated and compared with the given values for the prescribed curve. The result of the comparison is a set of error figures. The finite difference approximation to the first derivative of each error figure is then calculated for each of the dimensions, and a set of simultaneous linear equations is prepared composed of the approximations to the first derivatives as the coefficients, the dimensions of the imaginary model as the variables in the equations, and the error figures as augments. The set is solved by any convenient method such as, for example, the method of damped least squares as described in the hereinabove mentioned book, "Recent Advances in Optimization Techniques" to produce a set of changes of values for the dimensions that would reduce the errors if the errors were truly linear functions of the dimensions.

The process is iterative, and is repeated until values are found for the dimensions that reduce the errors to values within the design tolerances. If this cannot be done after a reasonable number of tries, the designer may make a substantial change in one or more dimensions of the model and start over, or, if necessary, one or more additional degrees of freedom may be introduced into the system such as by adding a pair of additional links.

The capacity of modern computers for rapidly completing seemingly endless calculations makes possible the optimized conformance of complex linkages to noncircular curves to within very close tolerances. It has been possible, for example, to calculate the dimensions for a seven-bar linkage to produce theoretically an output motion conforming to a preselected elliptical arc within less than one-tenth the wavelength of visible light. With the commercial availability of interferometric instruments and other very precise devices for measuring lengths, actual linkages may be built conforming to within less than the wavelength of light to the theoretical dimensions, and actual motions produced that conform to within a few microinches of the desired motions.

Figure 6:
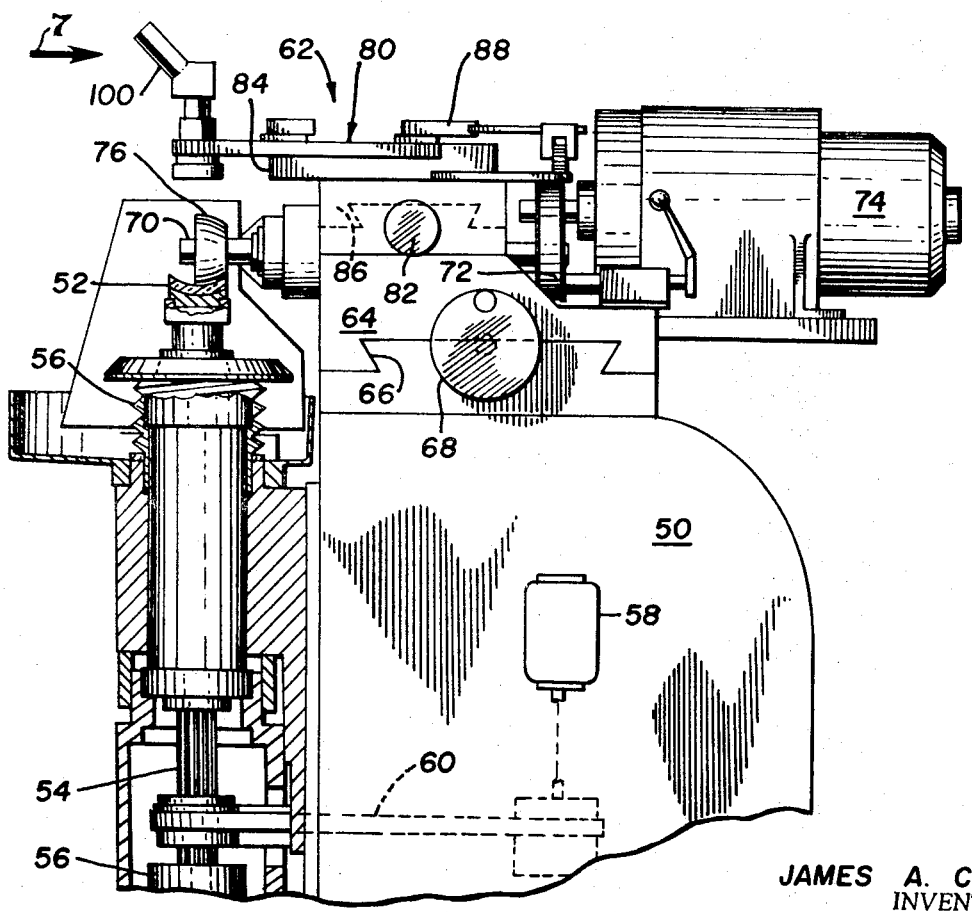
FIG. 6 is a side elevational view, partly in section, taken along the line 6–6 of FIG. 7, of a lens-shaping machine in accordance with the invention incorporating a seven-bar linkage of the general type shown in FIG. 5.
Figure 7:
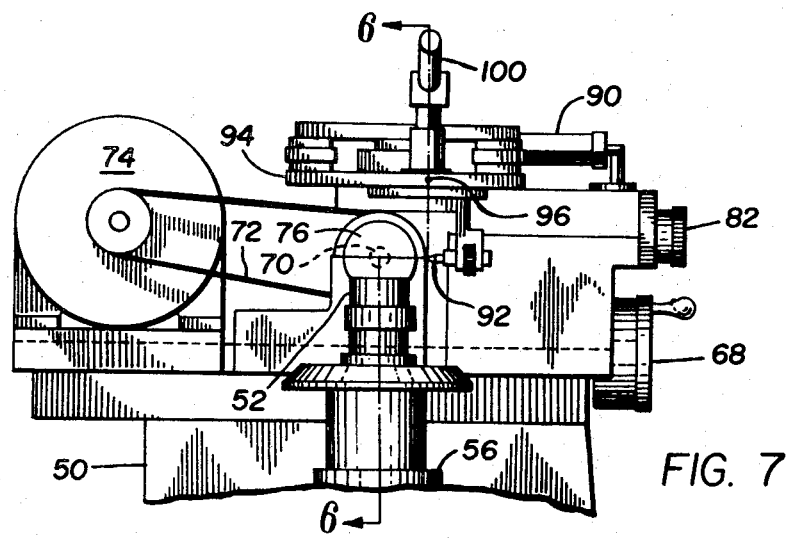
FIG. 7 is an end elevational view of the machine shown in FIG. 6, taken in the direction of the arrow 7 in FIG. 6.
Figure 8:
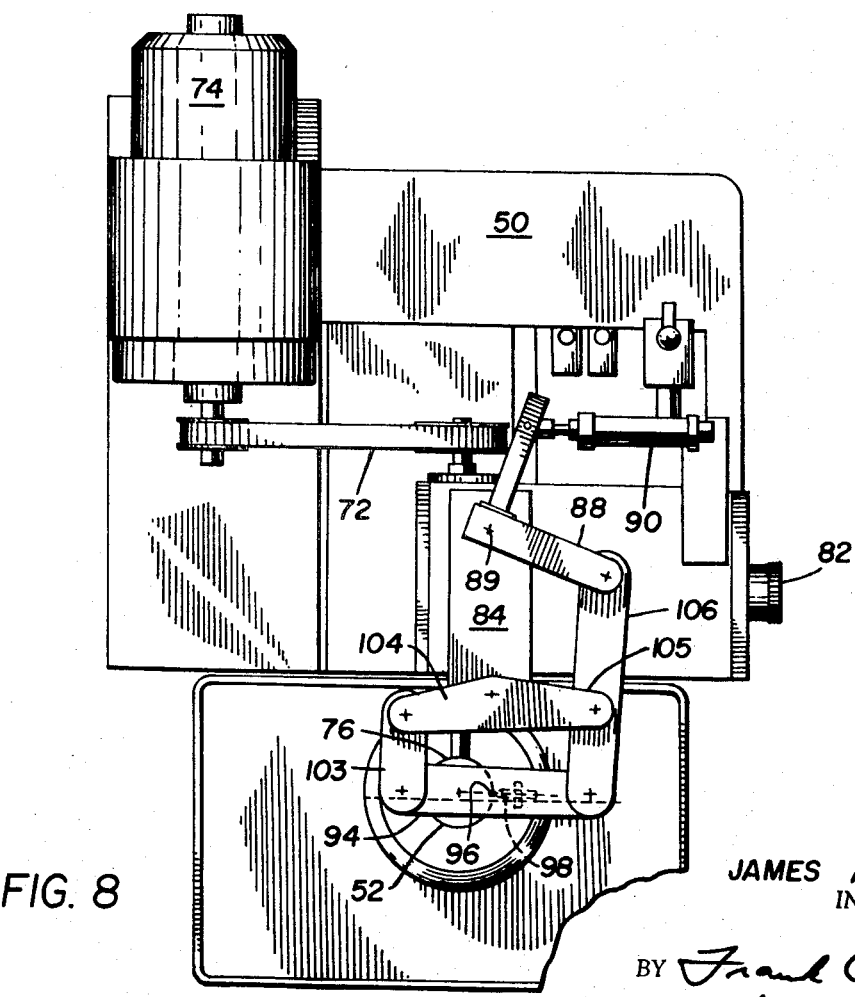
FIG. 8 is a plan view of the shaping machine shown in FIGS. 6 and 7.

An actual lens-shaping machine including a seven-bar linkage according to the invention is illustrated in FIGS. 6—8. The machine includes a heavy, rigid base support 50 on which all the operative components of the machine are mounted. The workpiece 52 is mounted at the upper end of a splined, vertical spindle 54 called the work spindle, which is mounted in rigidly fixed bearings 56 at the front of the support 50, to the left as viewed in FIG. 6. The spindle 54 is vertically reciprocatable to allow the introduction and removal of successive workpieces 52. As shown, the spindle 54 is driven by a motor 58 through a belt drive 60.

The curve-generating mechanism, generally designated 62, is mounted on top of the base support 50, and includes a main carriage 64 laterally reciprocatable on ways 66 under control of a micrometer drive mechanism 68. The tool spindle 70 is mounted horizontally in bearings (not shown) fixed in the carriage 64, and is driven through a belt drive arrangement 72 by a motor 74. In operation, the carriage 64 is adjusted in position by the micrometer drive 68 to bring the tool spindle 70 accurately into alignment with the work spindle 54. A grinding wheel 76 is fixed at the front end of the tool spindle 70.

The linkage generally designated 80 is laterally reciprocatable on the carriage 64 under control of a second micrometer drive mechanism 82. The base link 84 is fixed to the carriage 86 upon which the linkage is mounted. The drive crank 88 is oscillated about the fixed pivot 89 by a pneumatic cylinder 90. A diamond stylus 92 is mounted on the output link 94 with its tip in accurate alignment with the output motion point 96 on the link 94. The stylus 92 is advanceable through a micrometer screw drive 98 to compensate for wear of the stylus. Preferably, a microscope 100 including a reticle (not shown) is mounted on the output link 94 for viewing the tip of the stylus 92 so that it can be kept always accurately in alignment with the output motion point 96.

The stylus 92 dresses the cutting tool 76, shaping its rim surface in conformity with the output motion of the linkage 80. The cutting tool 76 transfers the curve generated by the linkage 80 from the stylus 92 to the workpiece 52. The entire linkage 80 is moved laterally to compensate for wear of the cutting tool 76 without affecting the generated curve. Also, as the cutting tool 76 wears, the workpiece 52 is raised to maintain adequate pressure contact between it and the cutting tool 76.

All of the links 84, 88, 94, 103, 104, 105, and 106 may be made adjustable in length, as indicated schematically in FIG. 2, and the fixed, or base link 84 may be adjustably fixed to the carriage 64, so that the linkage may be readily rearranged as desired to conform its output motion to any predetermined curve. The links may be adjusted to the calculated lengths with a high degree of accuracy and precision by the use of modern, precision measurement devices. They are then locked and assembled for operation.

It is preferred in the practice of the invention to optimize the linkage in such a way that the diamond stylus 92 remains always within a few degrees of a constant angle relative to the generated curve. This factor may be included in the optimization calculations without difficulty.

Figure 9:
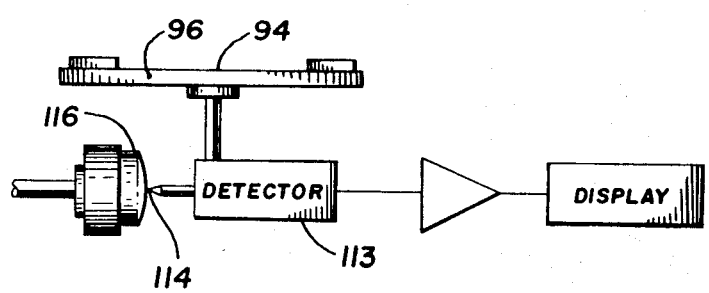
FIG. 9 is a fragmentary view, partly in schematic form, of apparatus according to the invention arranged for checking surfaces.

Linkages according to the invention may be easily modified to check aspherical surfaces to determine how closely they conform to predetermined shapes. As shown in FIG. 9, this may be done simply by mounting a micrometer, or other sensing device 113 on the output link 94 with the tip of its stylus 114 accurately aligned with the motion point 96. The workpiece 116 to be checked is carefully mounted in proper relation to the linkage, and the linkage is operated to scan the stylus 114 across the workpiece.

Figure 10:
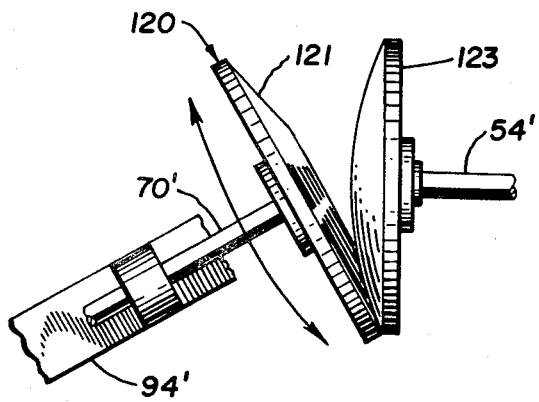
FIG. 10 is a fragmentary view of a lens-shaping machine according to the invention illustrating a modified tool-mounting arrangement.

An alternative mounting arrangement for a cutting wheel on a linkage of the invention is shown in FIG. 10. In this case, the wheel 120 has a bevelled rim portion 121 that provides a relatively large area cutting contact with the workpiece 123. The wheel 120 is mounted for rotation about an axis parallel to the output link 94' and inclined at an obtuse angle relative to the work spindle 54'. The axes of the work spindle 54' and of the tool spindle 70' are in a common plane. The advantage of the arrangement is in the large area of cutting engagement, which enables faster working than in cases where a wheel arranged for simple rim engagement with the workpiece is used to generate the desired curve.

This is a companion application of the concurrently filed application of Alfreds E. Niedols, Ser. No. 725,818, entitled "Apparatus for Making Aspherically Curved Bodies Using Linkage Mechanism," and of the concurrently filed application of William G. Peck, Ser. No. 725,817, entitled "Method of Calculating Optical Systems and Linkages for Making Elements Thereof," both assigned to the present assignee.

I claim:

1. Apparatus for generating a noncircular curvilinear motion comprising a support, and a six-bar linkage mounted on said support, said linkage including:
   a. a drive crank pivoted on said support;
   b. an oscillating crank pivoted on said support and spaced from said drive crank;
   c. a connecting rod pivotally connected between said drive crank and said oscillating crank at points thereon spaced from said support and holding said cranks in spaced apart relation;
   d. a first auxiliary link pivoted on said support at a point spaced from said drive crank and said oscillating crank;
   e. a second auxiliary link pivotally connected to said first auxiliary link at a point thereon spaced from said support and to said connecting rod at a selected point thereon spaced from said drive crank and said oscillating crank; and
   f. means defining a motion point on said second auxiliary link between the pivot connections thereon, the dimensions of said linkage being selected so that the motion point traces a predetermined noncircularly curved path during operation of said linkage.

2. Apparatus for generating a noncircular curvilinear motion comprising a support, and a seven-bar linkage mounted on said support, said linkage including:
   a. a drive crank pivoted on said support;
   b. an oscillating crank pivoted on said support and spaced from said drive crank;
   c. a connecting rod pivotally connected between said drive crank and said oscillating crank at points thereon spaced from said support and holding said cranks in spaced apart relation;
   d. an extension fixed to said drive crank and extending therefrom on the opposite side from the main portion of the drive crank of the point where the drive crank is pivoted on said support;
   e. first and second auxiliary links pivotally connected in series with each other between a point on said extension spaced from said support and a point on said connecting rod spaced from said drive crank and said oscillating link; and
   f. means defining a motion point on one of said first and second auxiliary links between the pivot connections thereof, the dimensions of said linkage being selected so that the motion point traces a predetermined noncircularly curved path during operation of said linkage.